(12) United States Patent
Krishnamurthy et al.

(10) Patent No.: US 7,912,695 B2
(45) Date of Patent: Mar. 22, 2011

(54) PERFORMANCE EVALUATION OF J2EE APPLICATIONS

(75) Inventors: Ramchandar Krishnamurthy, Palya (IN); Deepak Brijnandan Goel, Pune (IN); Prabhakar Mynampati, Sullerpet (IN); Sandeep M. Karamongikar, National Games Village (IN)

(73) Assignee: Infosys Technologies Ltd., Bangalore (IN)

( * ) Notice: Subject to any disclaimer, the term of this patent is extended or adjusted under 35 U.S.C. 154(b) by 750 days.

(21) Appl. No.: 11/854,520

(22) Filed: Sep. 12, 2007

(65) Prior Publication Data

US 2008/0133212 A1    Jun. 5, 2008

(30) Foreign Application Priority Data

Sep. 12, 2006  (IN) .................................. 1656/2006

(51) Int. Cl.
*G06F 9/45* (2006.01)
(52) U.S. Cl. ......................................................... 703/22
(58) Field of Classification Search ............... 703/16, 703/22, 23, 26
See application file for complete search history.

(56) References Cited

U.S. PATENT DOCUMENTS

| | | | |
|---|---|---|---|
| 6,934,755 B1 * | 8/2005 | Saulpaugh et al. | 709/226 |
| 2002/0016869 A1 * | 2/2002 | Comeau et al. | 709/324 |

OTHER PUBLICATIONS

Kambhampaty et al. (Performance Modeling for Web-Based J2EE and .Net application, Oct. 2005).*
"Continuous Performance Engineering of J2EE Applications using Radien Simulator," Infosys PowerPoint Presentation, 2007, 23 pages.
Goel, "Software Infrastructure Bottlenecks in J2EE," published on ONJava.com, Jan. 19, 2005, 6 pages.
"Infosys Helps US Banking Giant to Accurately Predict Application Software," Case Study, 2004, 4 pages.
Krishnamurthy et al., "Memory Contention in J2EE Applications for Multiprocessor Platforms," published on ONJava.com, Nov. 10, 2004, 5 pages.
Tiwari et al., "Experiences of using LQN and QPN tools for performance modeling of a J2EE Application," *CMG 2006 Proceedings*, Dec. 2006, 11 pages.
Mynampati, "Simulation Based Performance modeling and Capacity Planning of Distributed E-Business Applications," on or before Sep. 7, 2007, 14 pages.

* cited by examiner

*Primary Examiner* — Jason Proctor
*Assistant Examiner* — Andre Pierre Louis
(74) *Attorney, Agent, or Firm* — Klarquist Sparkman, LLP (57) ABSTRACT

Simulation techniques for measuring the performance of J2EE applications are described. Simulation models for J2EE systems are generated which utilize one or more simulation components comprising queuing centers. The queuing centers employ logic to emulate J2EE thread models by locking on threads when messages are received by simulation components and waiting to unlock until a response is received from every subsequent component in the system. Additionally, simulation components which correspond to J2EE system components running on java virtual machines employ logic which emulates overhead introduced during memory allocation and garbage collection. The simulation models are also utilized during software development in a continuous performance evaluation process which gives feedback at each software development stage based on simulations run using the models described.

7 Claims, 9 Drawing Sheets

Fig. 1a  J2EE System Example

Fig. 1b  J2EE Simulation Model 100

Software 980 Implementing J2EE
Simulation and Development Techniques

US 7,912,695 B2

PERFORMANCE EVALUATION OF J2EE APPLICATIONS

FIELD OF TECHNOLOGY

The techniques and systems described herein are directed to performance simulation and testing of distributed systems.

BACKGROUND

Software systems development relies on effective testing to develop systems with efficient, effective performance. Distributed systems in particular rely on careful development techniques, as they often comprise multiple separate-but-interconnected components which present frequent opportunities for performance-damaging bottlenecks. One such example of distributed systems are systems utilizing the Java2 Platform, Enterprise Edition, known generally as J2EE.

J2EE system implementations are very popular, in particular in online business applications. Implementing a system in J2EE allows developers to take advantage of simplified architectures which are based upon known standard components. J2EE's ability to scale to meet business demand, as well as having established development tools, means it is the choice of many businesses.

J2EE, however, does have particular implementation details that affect many systems which utilize it. In particular, J2EE's thread model can introduce delays and scalability issues. And, because many J2EE components are run on java virtual machines ("JVMs"), there are known scalability artifacts introduced from the way these JVMs handle memory management.

Current techniques exist to aid developers in developing and testing J2EE applications. However, existing techniques do not provide facilities for simulating specific J2EE issues and bottlenecks, especially with regard to simulation. As such, these development tools do not provide an ability to efficiently track development and accurately model system performance. Given the popularity of J2EE applications, what is needed is a set of techniques that provide the ability to accurately develop and test J2EE applications, including consideration of J2EE-specific issues.

SUMMARY

Various implementations of simulation techniques for measuring the performance of J2EE applications are described. Generation of simulation models for J2EE systems is described wherein the models utilize one or more simulation components comprising queuing centers. In one implementation, queuing centers employ logic to emulate J2EE thread models by locking on threads when messages are received by simulation components and waiting to unlock until a response is received from every subsequent component in the system. Additionally, simulation components corresponding to J2EE system components running on java virtual machines employ logic which emulates overhead introduced during memory allocation and garbage collection. Simulation models can be used during software development in a continuous performance evaluation process which gives feedback at each software development stage based on simulations run using the models described.

In one implementation, a system is described for modeling the behavior of a distributed multi-threaded application which comprises one or more components. The system comprises a plurality of queuing centers configured to emulate the handling of multiple threads.

In another implementation, a method for developing a performance model for a J2EE application is described. The method comprises performing development at a development stage for a J2EE-based application to produce performance metrics, utilizing the performance metrics to produce a simulation model for the J2EE-based application, the simulation model comprising model components which emulate thread and memory behavior, and performing a simulation using the model to produce simulation metrics for the application.

In another implementation, a method of simulating behavior of a J2EE application, the application comprising J2EE components, is described. The method comprises generating a simulation model for the J2EE application, the model comprising one or more simulation components. The method also comprises, for each of one or more components from the J2EE components, simulating the component with a queuing center simulation component, the queuing center simulation component configured to emulate thread locking behavior for messages sent through the simulation. The method also comprises, for each of one or more components from the J2EE components which are implemented in the application using a java virtual machine, simulating the component with a queuing center simulation component configured to emulate memory allocation and garbage collection behavior for the java virtual machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be made apparent from the following detailed description of embodiments that proceeds with reference to the accompanying drawings.

DETAILED DESCRIPTION

1. Examples of Development Techniques

Tools take advantage of existing development techniques for software development. These techniques include:

Discrete Event Simulation ("DEVS"): DEVS provides a common basis for discrete-event modeling and simulation. DEVS simulations utilize a continuous time base with a finite number of discrete events per specified time period. In a DEVS simulation, events can change the state of a system but between events a system state remains unchanged.

Application Profiling: Application profiling allows developers to capture performance metrics during actual performance of a software component. In some implementations, the component being profiled is implemented in the Java Virtual machine Tool Interface ("JVMTI") to facilitate the capture of performance metrics.

Performance Engineering through a Software Development Lifecycle: Preferably, development can be performed throughout a software development lifecycle ("SDLC"). For example, performance aspects that can be addressed include workload modeling during the requirement phase and performance and load testing during the system test phase.

The techniques and systems described herein achieve advantages over existing techniques in developing and modeling J2EE systems. In particular, using the techniques described herein, J2EE applications are modeled using simulation models which take into account specific J2EE aspects which affect performance. In particular, the simulation models exhibit behavior that emulates the J2EE thread model as well as particular memory management aspects of J2EE components running on Java virtual machines such as garbage collection and memory allocation It should be noted that, while the terms J2EE and Java2 Platform Enterprise Edition are used herein, this should not be read to limit the techniques and systems described herein to particular versions of the Java Enterprise Edition technology. In particular, the techniques and systems described herein can also be used with versions known as "Java Enterprise Edition" as same or similar technologies.

2. Examples of J2EE Simulation Models

Figure 1A:
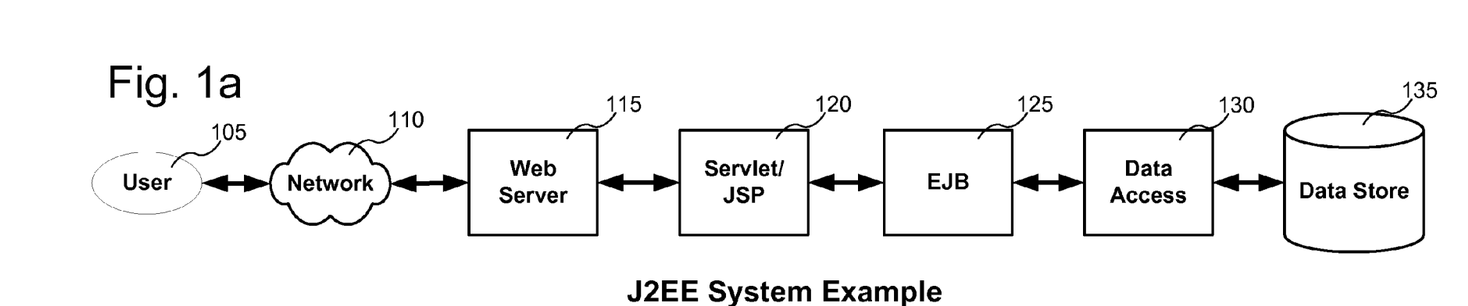
FIGS. 1a and 1b are block diagrams of an exemplary J2EE system and an exemplary J2EE simulation model.

FIG. 1*a* is a block diagram illustrating the architecture of an exemplary J2EE system. It should be noted that, while particular components are illustrated in FIG. 1*a*, this should not be viewed to imply any particular requirements on components that should or should not be present in order that a system be developed according to the techniques described herein.

A typical J2EE system, such as the one in FIG. 1*a*, consists of multiple separate components which interact through the sending of messages back and forth between adjacent components. In the illustrated example, the system is a web-based system which serves information to a user in a commercial context. Thus, the Figure illustrates a user 105 who interacts with a front-end web server 115 via a network 110. In various implementations, the web server may or may not be Java-based, but is configured to interact with J2EE components. Additionally, while a network is illustrated, systems which fall under the ambit of simulation and development according to the techniques described herein do not all necessarily require the use of any particular network, Internet, WAN, or LAN. In alternative J2EE system implementations, the user 105 may interact with the front end of the system directly, and not over a network.

In a typical workflow, however, the user 105 sends a web page request (such as from a web browser, not illustrated here) to the J2EE system via the network 110. The web server 115 then parses the request and sends the dynamic aspect of the request to the J2EE web container 120 which manages servlets and Java Server Pages ("JSPs"). In the illustrated example, the servlets and JSPs handle the presentation aspect of requests and pass requests which are to be handled by business logic on to the Enterprise Java Beans ("EJB") component 125. The EJB layer processes the business logic request and uses the data access component 130 for data needs. In one implementation of a J2EE system, the data access layer 130 encapsulates the data store 135. Finally, data is stored or accessed in a data store. In various implementation of a J2EE system the data store may be implemented as a relational database management store ("RDMBS") or as another database or data storage device or structure.

While the components illustrated in FIG. 1*a* are illustrated as separate components, various implementations of the techniques and systems described herein may be utilized with systems which combine or omit one or more of the illustrated components. Combinations may be done as hardware or software. Thus, in the illustrated example, each of the components in the architecture may reside in its own hardware or may share hardware resources with another component. In one typical deployment architecture, the Servelet/JSP component 120, the EJB component 125, and the Data Access component 130 are kept on the same hardware infrastructure. In some implementations of a J2EE system, the various components are referred to as "layers" due to their sequential and successive architecture.

Figure 1B:
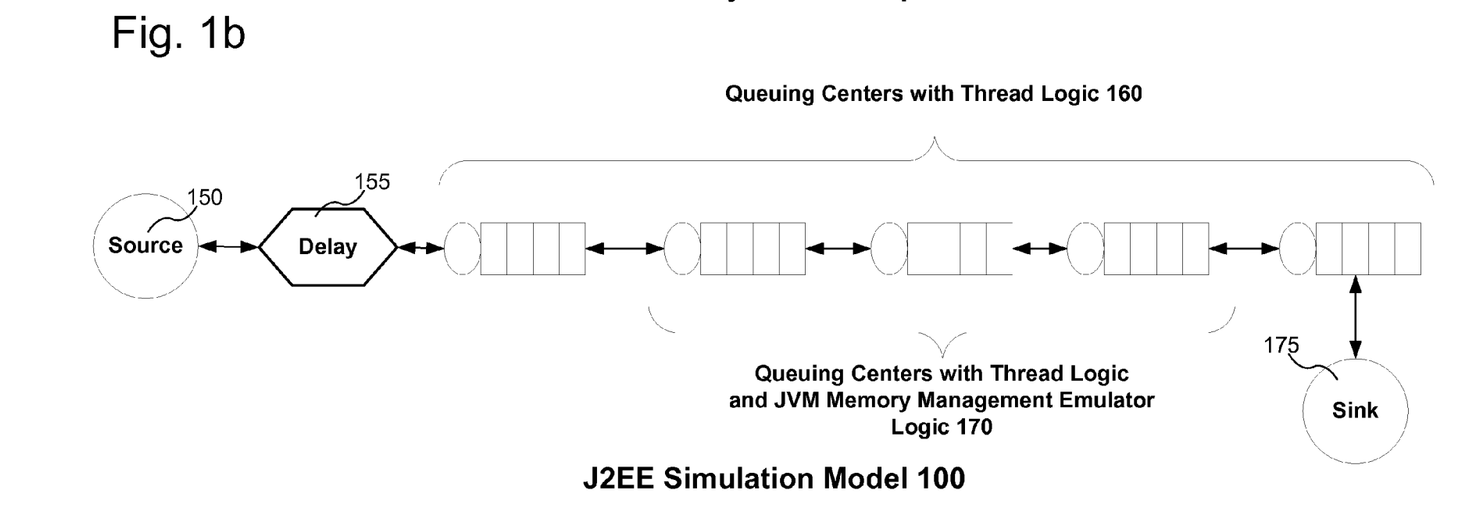
Figure 2:
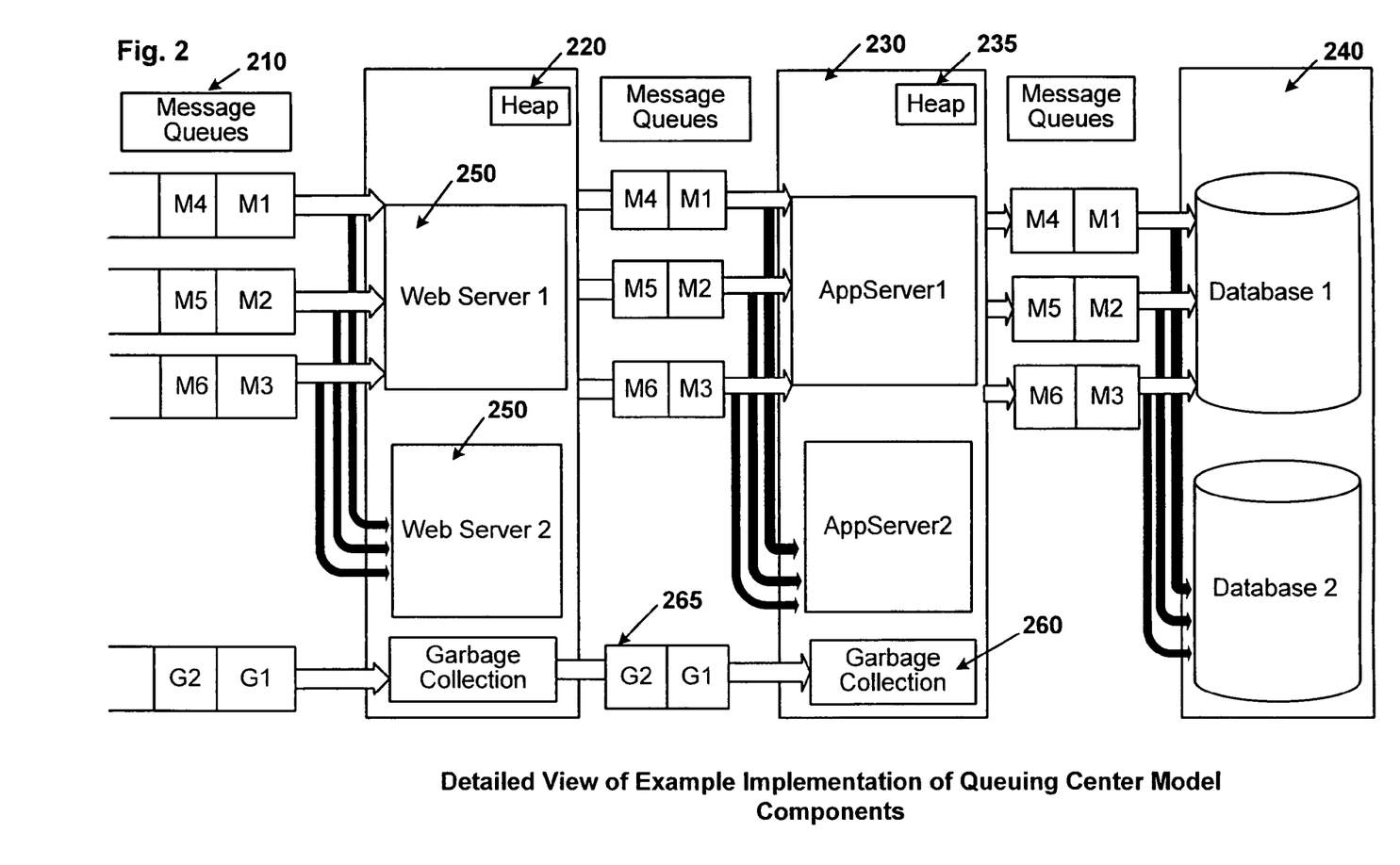
FIG. 2 is a block diagram illustrating a detailed view of stages of a J2EE simulations model.

FIG. 1*b* is a block diagram illustrating a J2EE simulation model 100 for simulating the performance of a J2EE system, such as the one illustrated in FIG. 1*a*, according to the techniques described herein. The simulation model 100 comprises simulation components. In one implementation these components simulate the system in part using DEVS techniques. As illustrated, and for the sake of easy comparison, the simulation model 100 contains one component for every illustrated component of the J2EE system architecture in FIG. 1*a*. This is not a requirement, however; in various implementations, simulation of multiple system components may be combined under a single simulation component or may be omitted. In one implementation, J2EE simulation models such as the model 100 are implemented in the Raden Simulator tool. Implementations of the described simulation techniques may be built using tools such as Java and Simulation APIs provided by SimJava.

The illustrated simulation model 100 comprises a number of components, a source 150, a delaying component 155, and a sink 175 which are used to emulate general effects of the system in its working environment. The model 100 also comprises a number of simulation components which are used to perform the simulation of actual J2EE system component logic and resource usage. In one implementation, these components are modeled with queuing centers. Examples of implementations of queuing centers as used herein are described in greater detail below with respect to FIG. 2.

The illustrated J2EE simulation model 100 also shows that the queuing centers 160 each comprise thread logic. Thus, as described below, they comprise logic which allows them to simulate the J2EE thread model, which when simulated, can add an overhead into the simulation to model the effects of threads on performance of the system. The illustrated model 100 also shows that certain of the simulated model components comprise queuing centers 170 which not only emulate the thread model, but also emulate the memory management overhead shown in J2EE components which are run on top of a JVM. Thus, as FIGS. 1*a* and 1*b* show, when compared together, in one implementation of the model, the simulation components which correspond to system components which are run on a JVM are simulated with the additional memory management logic in order to account for JVM execution aspects. In the illustrated example, these are the simulation components 170 which correspond to the Servelet/JSP component 120, the EJB component 125, and the Data Access component 130. Particular examples of thread and memory management logic will be discussed below.

FIG. 2 illustrates a block diagram illustrating example features of a series of interconnected queuing centers which are used in the J2EE simulation models described herein. The illustrated example shows aspects of queuing center simulation components for a web server 220, an application server 230, and a database 240. As illustrated, each queuing center comprises one or more message queues, such as message queue 210, each of which can be handled by internal logic. In the illustrated example, there can also be more than one processing resource simulations, such as the web server simulation logic modules 250, here labeled Web Server1 and Web Server2. Hence, the various messages which come in on the message queues may be handled by different processing logic, or, in the case of the database simulation component, logic to emulate database accesses.

Two of the simulation components additionally comprise heap structures, such as heap structure 235. These serve, in one implementation of the memory management logic, to emulate the overhead provided by contentions on heap memory, as is described later. Finally, two of the components comprise garbage collection logic 260. In the illustrated implementation, the garbage collection modules operate by introducing overhead (e.g. pausing) when messages are received, such as those in the garbage collection queue 265. This allows the logic to emulate the occasional overhead observed when a JVM pauses to undergo garbage collection. It may be noted that the two simulation components which comprise the heap and garbage collection logic are those which are emulating system components running on a JVM, while the illustrated database, which may not be run on a JVM, does not include these components.

3. Examples of Model Usage

Figure 3:
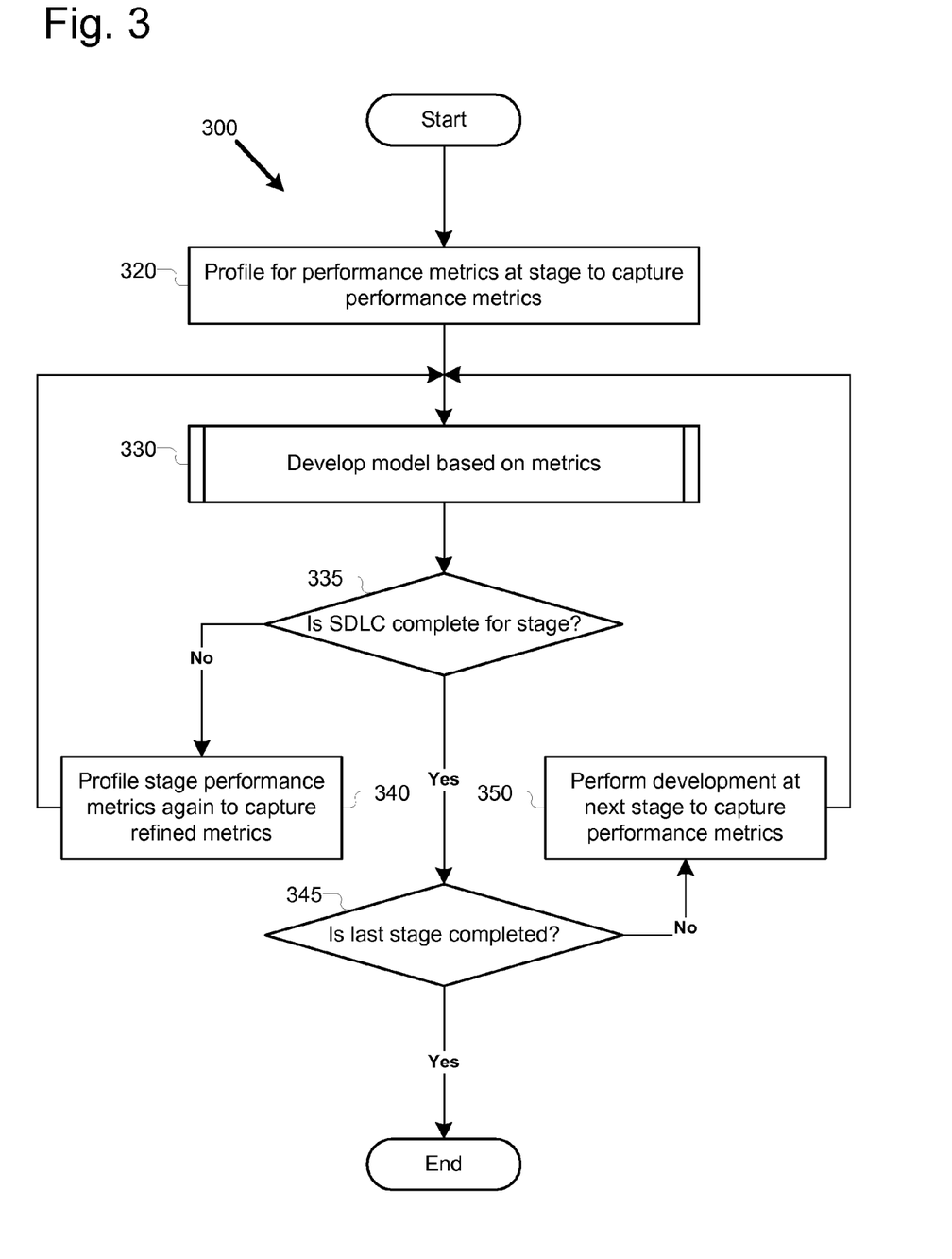
FIG. 3 is a flowchart illustrating an example process for developing a J2EE application using, for example, the J2EE simulation model of FIG. 1.

FIG. 3 is a flowchart illustrating an example process 300 for developing and testing a J2EE application using a model such as the simulation model 100. In various implementations, the illustrated process blocks may be merged, divided into subblocks, or omitted.

In various implementations, the process iterates over stages of the software development life cycle, and either creates or refines a J2EE simulation model at each iteration, based on development information received during the process. The process begins at block 320 where performance metrics are captured at an SDLC stage. In various implementations, the development may be performed at one of various stages, such as for example design, proof of concept, or architecture, and may result in development information or metrics such as resource allocation, requirements, input and output types, workflows, or use cases. Particular development stages, as well as information obtained, are described in greater detail below.

Next, at block 330, a model is developed based on the development metrics. If development is at an early stage, model development may be performed from scratch; in later stages, an existing model may be modified or refined in order to bring it in line with newly received SDLC information.

Next, at decision block 335, it is determined if the SDLC development is complete for the current stage. If not, then further performance metrics are profiled during the stage using information received from the model to obtain refined metrics at block 340 and the process repeats. If the stage is complete, however, the process continues to decision block 345 where it is determined if the last SDLC stage is complete. If not, at block 350 profiling is continued, but at the next SDLC stage. If, however, the last stage has been completed, the process ends. Particular examples of development stages, performance metrics, and how models are modified based on this information are given below.

4. Examples of Model Generation and Logic

Figure 4:
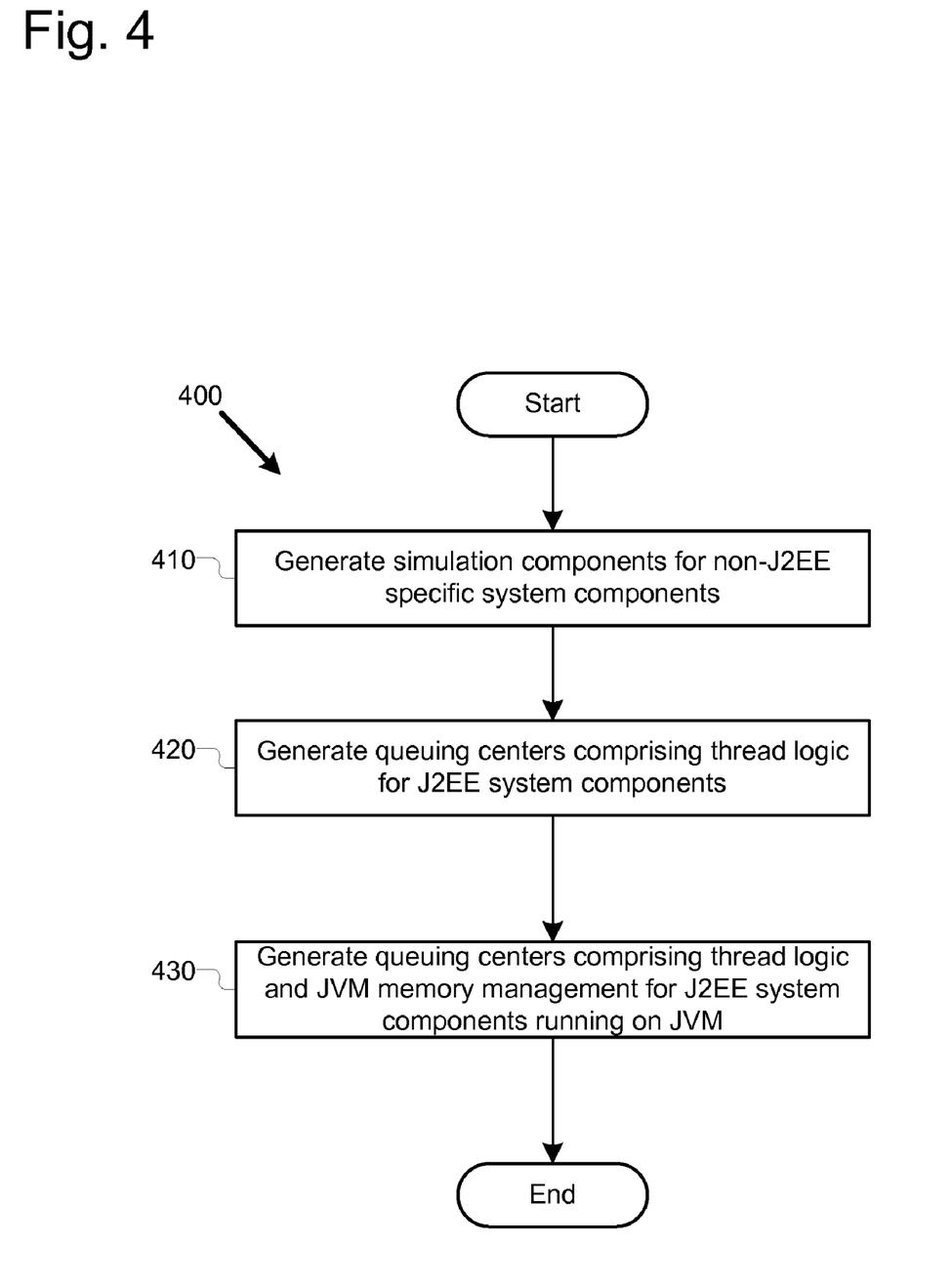
FIG. 4 is a flowchart illustrating an example process for generating a J2EE simulation model such as the J2EE simulation model of FIG. 1.

FIG. 4 is a flowchart illustrating an example process 400 for developing and generating a J2EE simulation model such as the model 100. In various implementations, the illustrated process blocks may be merged, divided into subblocks, or omitted. In various implementations, process 400 comprises all or part of the process of block 330 of FIG. 3. In one particular implementation, components such as the ones created in the process of FIG. 4 are created at the Architecture SDLC stage once the system is logically defined.

The process begins at block 410, where simulation components are generated for non-J2EE specific system components. In one implementation, the process of this block comprises traditional DEVS simulation techniques. Examples of components generated at this stage include the source, delay, and sink components illustrated in FIG. 1b. In various implementations, the generation of these components may be performed via a simulation generation tool, such as Raiden Simulator, along with possible user guidance.

Next, at block 420, queuing centers are generated which comprise thread logic for J2EE system components. Examples of these components include queuing centers to simulate database or web access activity, such as in FIG. 1b. Particular examples of thread logic implementations are described below with reference to FIG. 5. Next, at block 430, queuing centers are generated which comprise thread logic as well as JVM memory management logic. Examples of components like those generated at block 430 include the illustrated simulation components of FIG. 1b which simulate the Servelet/JSP, the EJB, and the Data Access components illustrated in FIG. 1a. Particular examples of memory management logic implementations are described below with reference to FIG. 6. After generating these components the process ends.

Figure 5:
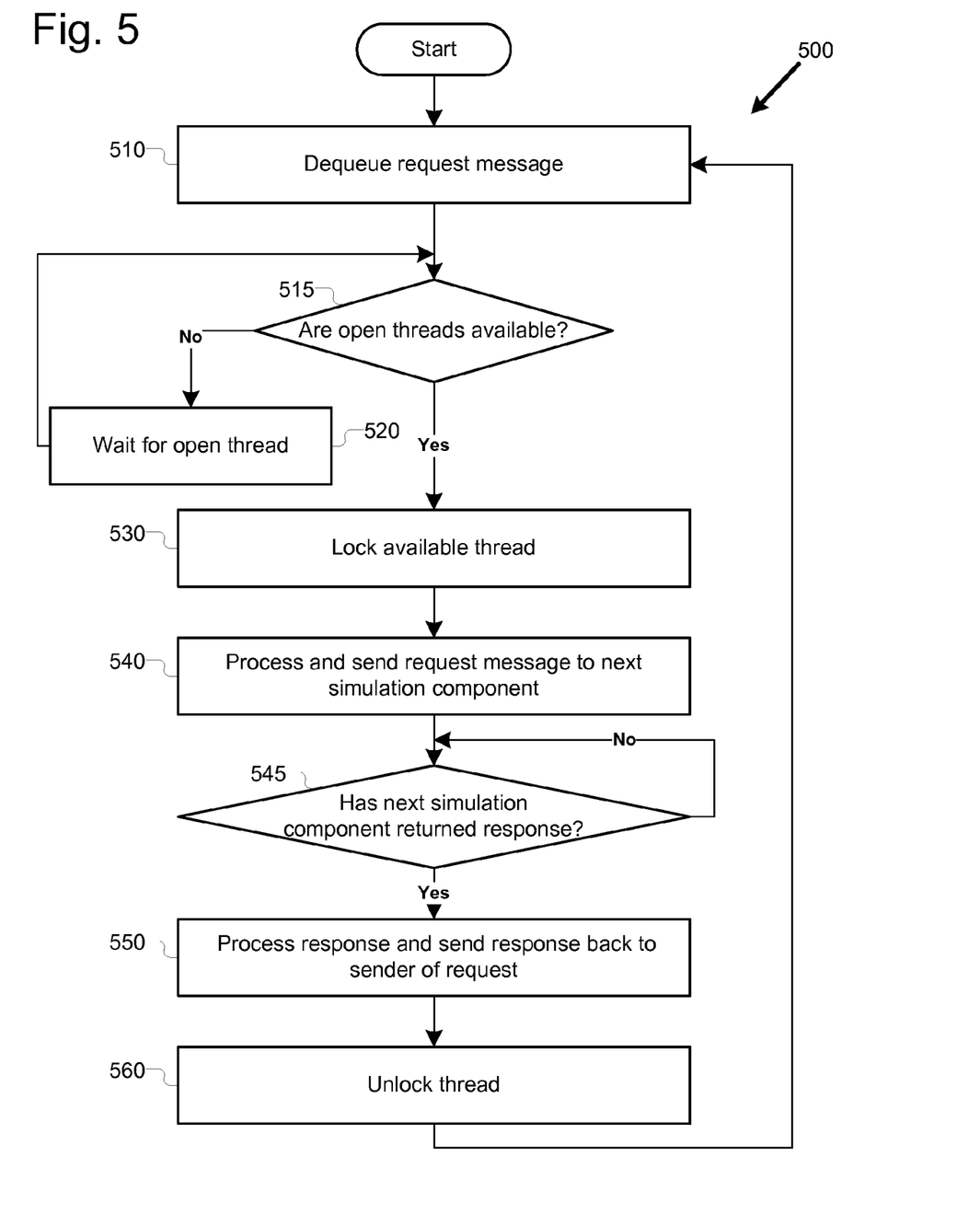
FIG. 5 is a flowchart illustrating an example process for emulating a J2EE thread model in a simulation model component.

FIG. 5 is a flowchart illustrating an example process 500 performed by a queuing center 160 for emulating thread logic while simulating a J2EE component. In various implementations, the illustrated process blocks may be merged, divided into subblocks, or omitted. The process of FIG. 5 generally emulates a finite number of threads by locking on threads when new requests are received. In the illustrated implementation, a thread is unlocked after every subsequent component in the simulated system has processed the request and responded.

The process begins at block 510, where a message is dequeued from a message queue for the queuing center containing a request for a service. At decision block 515, the queuing center determines whether any open threads are available. If none are available, at block 520 the center waits for an open thread. In one implementation, the thread may be returned to the queue; in another it is held by the simulation process which has dequeued it.

Once a thread is made available, at block 530 the queuing center locks the available thread. This will prevent later messages from being able to be processed, at least on this thread, until the thread is unlocked, providing overhead which more effectively emulates the thread model of J2EE systems. After the thread is locked, at block 540 the queuing center processes the request (according to its simulation logic) and sends any needed request to the next simulation component. Thus, for example, a servlet simulation component in the examples of FIGS. 1a and 1b would send any needed requests as messages to the EJB simulation component at this block.

The process then continues to decision block 545, where the queuing center checks to see if the next simulation component has returned a response. If it has not yet returned a response, the process loops back to this decision block until a response is returned. This is another method by which overhead is introduced to emulate the thread model; each simulation component will not allow an additional message to be received on the thread until all subsequent simulation components have responded to the request. This preserves the aspect of the J2EE thread model whereby threads in an actual system component will hang until they receive their response, and thus more accurately emulates J2EE thread-based overhead.

Once the response is received, the process continues to block 550, where the response is processed and a response is sent back to the sender of the original request. Then, at block 560 the queuing center unlocks the thread and returns to block 510 to dequeue another message, if applicable.

Figure 6:
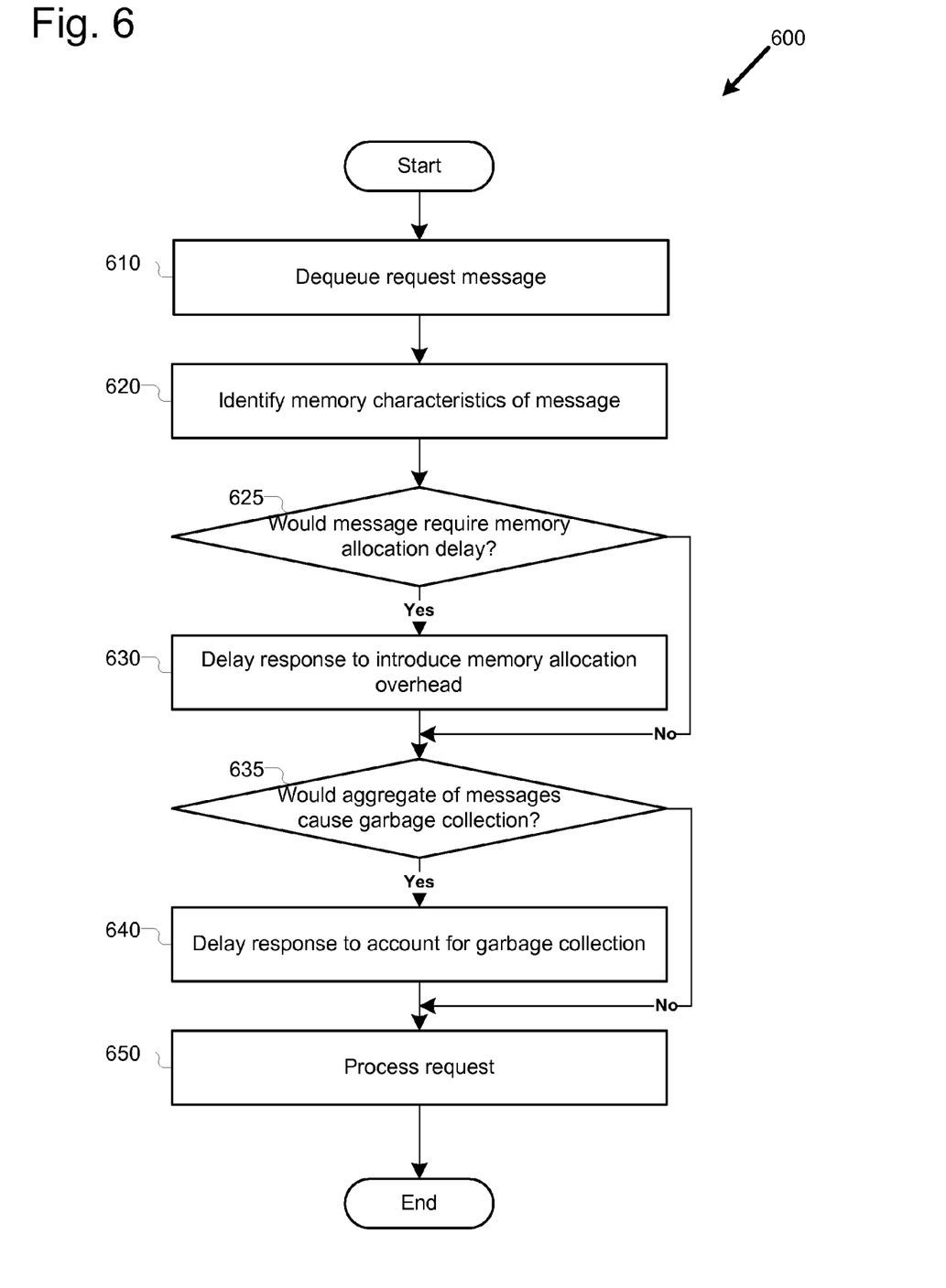
FIG. 6 is a flowchart illustrating an example process for emulating java virtual machine memory management in a simulation model component.

FIG. 6 is a flowchart illustrating an example process 600 performed by a queuing center 170 for emulating JVM-style memory management logic while simulating a J2EE component implemented on a JVM. In various implementations, the illustrated process blocks may be merged, divided into subblocks, or omitted. The process of FIG. 6 generally reviews memory characteristics of incoming messages to determine if, in a actual performance situation the corresponding JVM would either experience memory contention or would have to perform garbage collection. If so, the process introduces simulation performance overhead to emulate the real-life overhead.

The process starts at block 610, where a message is dequeued from a message queue for the queuing center containing a request for a service. In some implementations the message may be already dequeued because is has been processed by the thread logic described above or by other simulation logic. Next, at block 620 the queuing center identifies the memory characteristics of the message. Thus, in one implementation the queuing centers identify, as part of messages being sent, the amount of memory that will be required to respond to the message. In another implementation the queuing center receiving the message will itself analyze the message to determine the memory requirements needed.

Next, at block 625 the queuing center determines if the memory characteristics of the request would likely result in memory allocation overhead. In various implementations, two determinations are made to determine if overhead should be introduced at this stage. If so, the overhead is introduced at block 630 by pausing the simulation component. If not, the process continues to decision block 635.

In the first determination, the queuing center will determine that overhead should be introduced based on the total memory set for the queuing center. In one implementation, this is a constant paused time period, but the pausing frequency is dependent on both the arrival rate of requests which affect the memory as well as the memory which is consumed per each request.

The second determination made at decision block 625 is done if the queuing center is representing a multi-processor environment. Such environments are common among J2EE implementations Such implementations typically exhibit high memory overheads due to contention between processors. Thus, when message arrival rates are high for the queuing center and requests are concurrently processed by different processors in the simulation component, an overhead is introduced. This overhead is based, in one implementation, on experimental results obtained by performing J2EE operations on different platforms running a JVM.

Continuing to decision block 635, the queuing center determines if, based on the aggregate of messages received, a garbage collection would occur in the system component being simulated. If so, at block 640 any response is delayed to account for garbage collection overhead. In another implementation, not illustrated, garbage collection overhead is introduced directly through the use of specialized garbage collection messages, which cause a queuing center to pause when they are received, rather than the illustrated implementation. If no garbage collection overhead is necessary, or after it is introduced, the process then continues to block 650, where the request message can be further processed by the queuing center. The process then ends.

5. Examples of Development Processes

Figure 7:
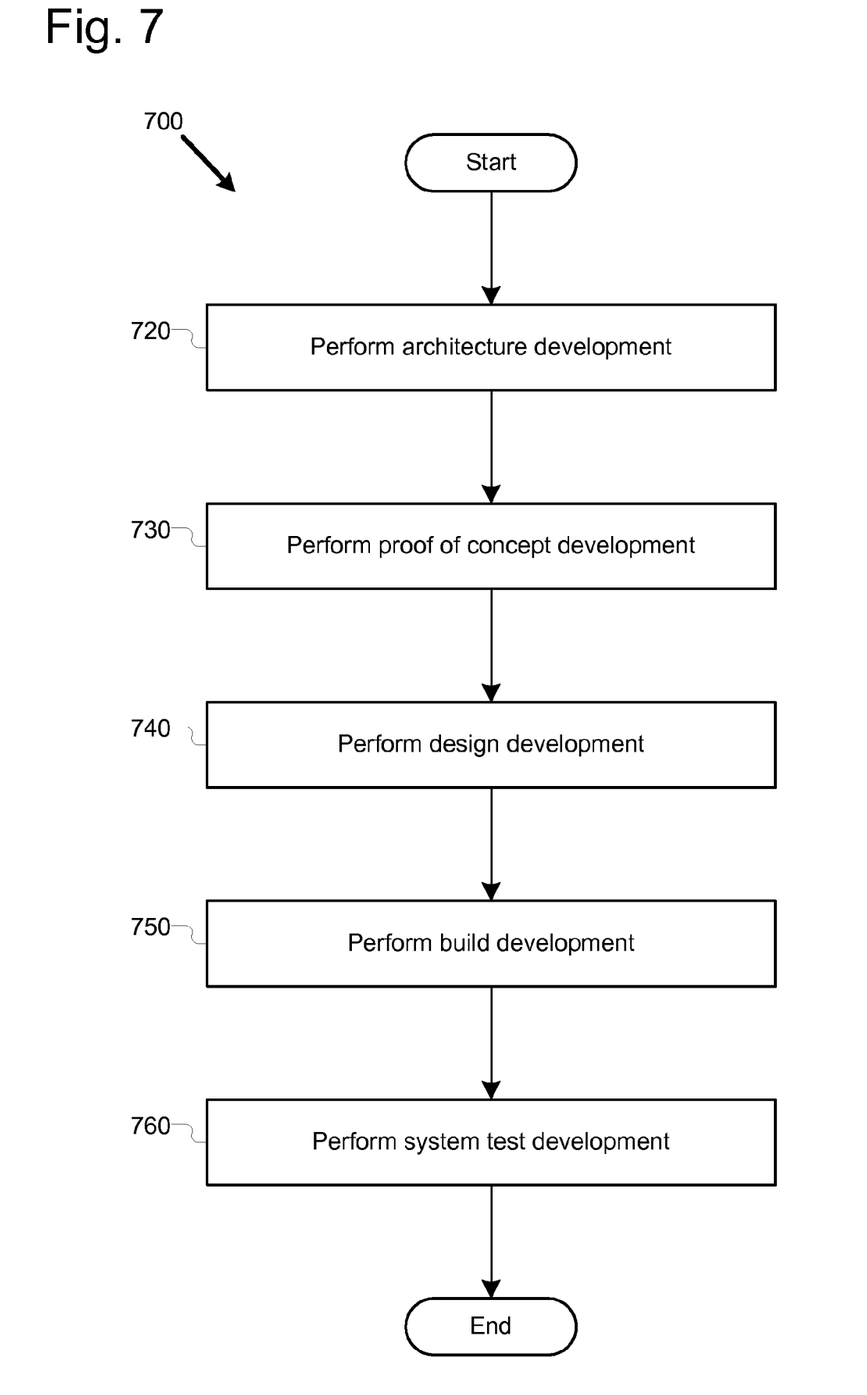
FIG. 7 is a flowchart illustrating an example process for utilizing a software development lifecycle to develop a J2EE application utilizing, for example, the J2EE simulation model of FIG. 1.
Figure 8:
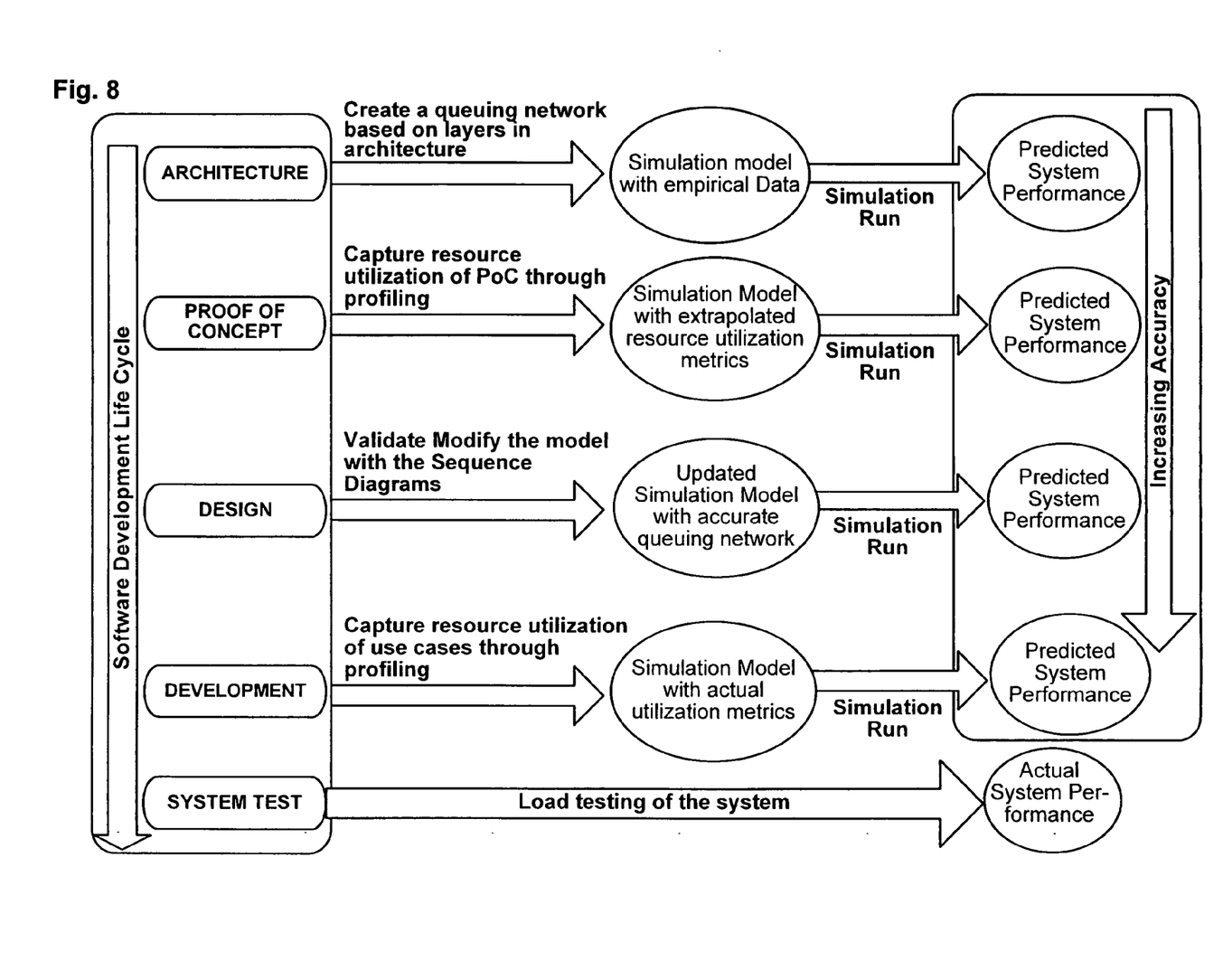
FIG. 8 is a block diagram illustrating dataflows during a software development process according to the techniques described herein.

FIG. 7 is a flowchart illustrating an example process 700 for performing a continuous performance process using the simulation model techniques described herein. In various implementations, the illustrated process blocks may be merged, divided into subblocks, or omitted. Additionally, while particular SDLC stages are represented in FIG. 7 (as well as FIG. 8), in alternative implementations different software development processes may be used along with the simulation model techniques discussed herein. While process 700 is illustrated as a straightforward, non-branching process, this is done for the sake of explanation. In various implementations, the looping development procedure of FIG. 3 is utilized to further refine model and system implementations.

The process of FIG. 7 shows a development process which gives a continuous view of the performance of a system at every stage of development. By performing the simulation at each stage, and using the information gained to further the system development, efficiencies can be gained which would not be available without simulation. Generally, at each stage of development, additional information is determined and utilized along with the simulation model to further refine the system. This can be seen in FIG. 8, which provides examples of the types of data which flow between development and simulation at each stage, and which show how accuracy of the simulation increases as the stages progress.

The process begins at block 720, where architecture development is performed. In one implementation, during the architecture phase the overall logical architecture of the J2EE system being simulated is defined in terms of its components and their interactions. Then, using the simulation model techniques described herein, a performance model is created based on this architecture. In one implementation, use cases and their workload can be entered into the model as development information. Thus, use cases are realized in the simulation by defining the use case as well as the path it would take through the components of the system to process requests and by establishing that in the model.

In one implementation, the model techniques may be combined with a searchable database which provides performance metrics for components. At this point, as in the process of FIG. 3, simulation can be performed using the model to provide an overall response time, throughput, and utilization figures for the system for each given workload.

Next, at block 730, proof of concept development is performed. In one implementation, this is done to validate the architecture previously generated. A proof of concept is, in one implementation, one of the most (if not the very most) complex use case which is known and can be realized. During this stage relevant components in the proof of concept are profiled to capture resource utilization metrics. In one implementation, this is done by making a few components to validate the proof of concept which are instrumented in order to facilitate profiling of performance metrics. This is done to give a more accurate idea of the system than can be gained from metrics obtained from the generic database. These metrics can then be used as a baseline, and from them a developer can extrapolate the values for other use cases. In one implementation this is done utilizing weights assigned to the complexity of each component required for fulfilling the use cases. At this point, simulation run with these new metrics will provide overall performance characteristics with a higher level of accuracy.

The process then continues to block 740 where the design SDLC stage is performed. At this stage, in one implementation, more components are identified, at a more accurate level than at the high-level architecture stage. For example, in one implementation, full sequence diagrams, such as in UML, are defined for various interactions. The simulation model is modified according to this development information by further refining it to accurately represent the design. Once again, simulation on the refined model more accurately emulates overall performance than at previous stages.

Next, at block 750, build development is performed. Thus, for example, simulation iterations are performed after completion of every use case. As in the proof of concept stage, actual component-level performance metrics are obtained, fed to the simulation model, and run to determine overall system performance. Thus, using this technique with each successive use case, the overall system performance is known and can be studied, rather than waiting for completion of the entire system to be built. Additionally, a yet higher level of accuracy is obtained at this more refined stage when compared to the empirical and extrapolated metrics of previous stages.

Finally, at block 760, system test development is performed. In one implementation, actual system testing is performed here, rather than testing using the simulation model, as the system is close to complete. After this stage the illustrated process ends.

9. Computing Environment

The above J2EE simulation and development techniques can be performed on any of a variety of computing devices. The techniques can be implemented in hardware circuitry, as well as in software executing within a computer or other computing environment, such as shown in FIG. 9.

Figure 9:
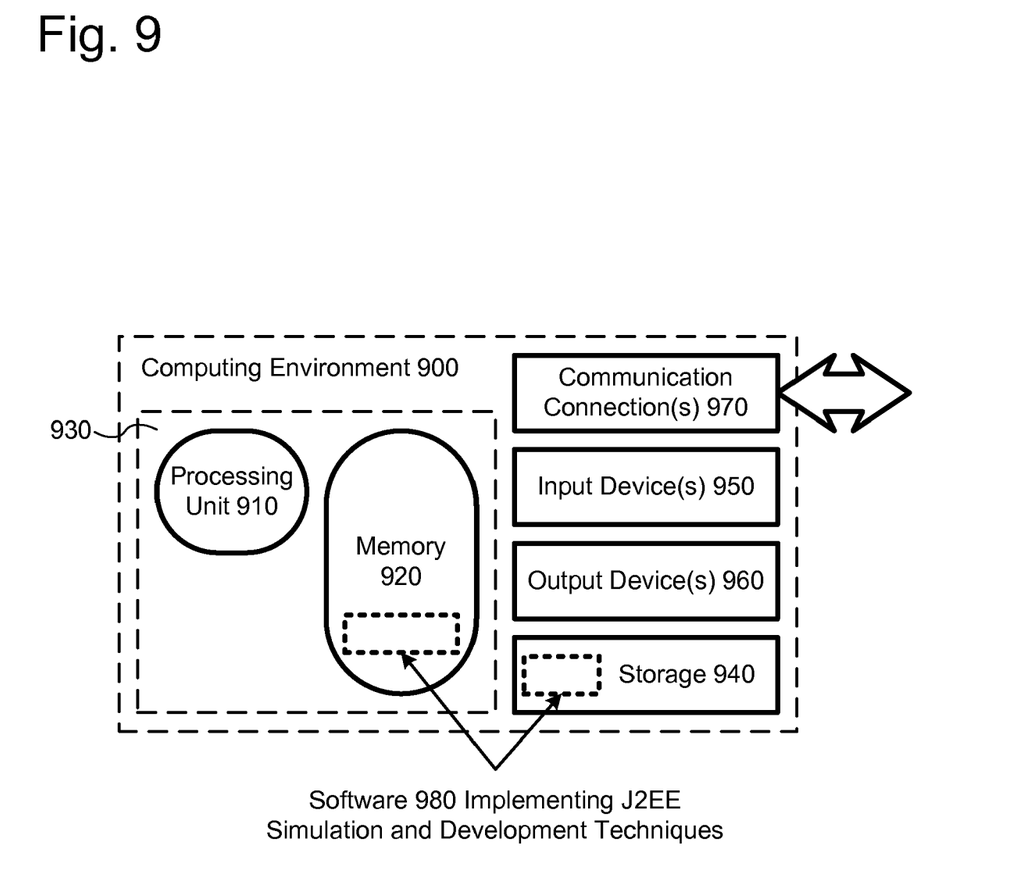
FIG. 9 is a block diagram of a suitable computing environment for implementing the techniques described herein.

FIG. 9 illustrates a generalized example of a suitable computing environment (900) in which described embodiments may be implemented. The computing environment (900) is not intended to suggest any limitation as to the scope of use or functionality of the invention, since the present invention may be implemented in diverse general-purpose or special-purpose computing environments.

With reference to FIG. 9, the computing environment (900) includes at least one processing unit (910) and memory (920). In FIG. 9, this most basic configuration (930) is included within a dashed line. The processing unit (910) executes computer-executable instructions and may be a real or a virtual processor. In a multiprocessing system, multiple processing units execute computer-executable instructions to increase processing power. The memory (920) may be volatile memory (e.g., registers, cache, RAM), non-volatile memory (e.g., ROM, EEPROM, flash memory, etc.), or some combination of the two. The memory (920) stores software (980) implementing the described techniques.

A computing environment may have additional features. For example, the computing environment (900) includes storage (940), one or more input devices (950), one or more output devices (960), and one or more communication connections (970). An interconnection mechanism (not shown) such as a bus, controller, or network, interconnects the components of the computing environment (900). Typically, operating system software (not shown) provides an operating environment for other software executing in the computing environment (900), and coordinates activities of the components of the computing environment (900).

The storage (940) may be removable or non-removable, and includes magnetic disks, magnetic tapes or cassettes, CD-ROMs, CD-RWs, DVDs, or any other medium which can be used to store information and which can be accessed within the computing environment (900). The storage (940) stores instructions for the software (980) implementing the described techniques.

The input device(s) (950) may be a touch input device such as a keyboard, mouse, pen, or trackball, a voice input device, a scanning device, or another device that provides input to the computing environment (900). For audio, the input device(s) (950) may be a sound card or similar device that accepts audio input in analog or digital form, or a CD-ROM reader that provides audio samples to the computing environment. The output device(s) (960) may be a display, printer, speaker, CD writer, or another device that provides output from the computing environment (900).

The communication connection(s) (970) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques described herein can be described in the general context of computer-readable media. Computer-readable media are any available media that can be accessed within a computing environment. By way of example, and not limitation, with the computing environment (900), computer-readable media include memory (920), storage (940), communication media, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc., which perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "extrapolate," and "compute" to describe computer operations in a computing environment. These terms are high-level abstractions for operations performed by a computer, and should not be confused with acts performed by a human being. The actual computer operations corresponding to these terms vary depending on implementation.

In view of the many possible variations of the subject matter described herein, we claim as our invention all such embodiments as may come within the scope of the following claims and equivalents thereto.

We claim:

1. A system for modeling behavior of a distributed multi threaded J2EE application comprising one or more components, the system comprising:
at least one processor;
memory; and
a plurality of queuing centers for simulating the distributed multi threaded J2EE application, wherein the plurality of queuing centers are configured to emulate handling of multiple threads;
wherein the plurality of queuing centers are further configured to handle processes for a limited number of threads by:
if an unlocked thread out of the limited number of threads is available when a message comprising a request for service is received, locking the unlocked thread in the queuing center, wherein the locking prevents later messages requesting services from being processed on the thread;
sending a second request for service to a second queuing center; and
retaining the lock on the thread until the second queuing center responds to the second request for service; and
wherein at least one of the plurality of queuing centers is configured to emulate at least one of the one or more components running on one or more java virtual machines by emulating java virtual machine memory management, wherein emulating java virtual machine memory management comprises introducing memory management overhead for emulating garbage collection and memory allocation procedures; wherein introducing memory management overhead comprises: analyzing the received message to determine memory characteristics for the received message; simulating fully occupied memory by pausing the at least one of the plurality of queuing centers; simulating memory allocations in concurrent processing by pausing the at least one of the plurality of queuing centers; and simulating a garbage collection in the java virtual machine based on a message arrival rate and the memory characteristics for the received message.

2. The system of claim 1, wherein introducing memory management overhead for emulating garbage collection procedures comprises pausing a queuing center for an amount of time based on input memory request metrics.

3. The system of claim 1, wherein the system introduces the memory management overhead based on memory characteristics defined for received message types.

4. A method for modeling the behavior of a distributed multi threaded J2EE application comprising one or more components, the method comprising:
simulating, by a computer, the distributed multi threaded J2EE application comprising one or more components using at least queuing centers that emulate handling of multiple threads;
wherein the queuing centers handle processes for a limited number of threads by:
if a thread of the limited number of threads is open when a message comprising a request for service is received, locking the thread in the queuing center, wherein the locking prevents processing of later messages requesting services on the thread;
sending a second request for service to a second queuing center; and
unlocking the thread when a response to the second request for service is received; and
by at least one of the queuing centers, emulating at least one of the one or more components running on one or more java virtual machines by emulating java virtual machine memory management, wherein emulating java virtual machine memory management comprises introducing memory management overhead for emulating garbage collection and memory allocation procedures;
wherein introducing memory management overhead comprises:
analyzing the received message to determine memory characteristics for the received message;
simulating fully occupied memory by pausing the at least one of the queuing centers;
simulating memory allocations in concurrent processing by pausing the at least one of the queuing centers; and
simulating a garbage collection in the java virtual machine based on a message arrival rate and the memory characteristics for the received message.

5. The method of claim 4, wherein introducing memory management overhead for emulating garbage collection procedures comprises pausing the at least one of the queuing centers for an amount of time based on input memory request metrics.

6. The method of claim 4, wherein introducing memory management overhead for emulating memory allocation procedures comprises introducing memory management overhead based on memory characteristics defined for received message types.

7. A computer-readable storage medium storing computer-executable instructions that when executed cause a computer to perform a method for modeling the behavior of a J2EE application comprising one or more components, the method comprising:
simulating the J2EE application comprising one or more components using at least queuing centers that emulate the handling of multiple threads;
wherein the queuing centers handle processes for a limited number of threads by:
if a thread of the limited number of threads is open when a message comprising a request for service is received, locking the thread in the queuing center, wherein the locking prevents processing, on the thread, of later messages requesting services;
from the queuing center, sending a second request for service to a second queuing center; and
unlocking the thread at the queuing center when a response to the second request for service is received; and
by at least one of the queuing centers, emulating at least one of the one or more components running on one or more java virtual machines by emulating java virtual machine memory management, wherein emulating java virtual machine memory management comprises introducing memory management overhead for emulating garbage collection and memory allocation procedures;
wherein introducing memory management overhead comprises:
analyzing the received message to determine memory characteristics for the received message;
simulating fully occupied memory by pausing the at least one of the queuing centers;
simulating memory allocations in concurrent processing by pausing the at least one of the queuing centers; and
simulating a garbage collection in the java virtual machine based on a message arrival rate and the memory characteristics for the received message by pausing the at least one of the queuing centers.

* * * * *